(No Model.) 2 Sheets—Sheet 1.
A. C. SHUTTLEWORTH.
ELECTROMAGNETIC INDUCTION SYSTEM OF PROPULSION.
No. 554,962. Patented Feb. 18, 1896.
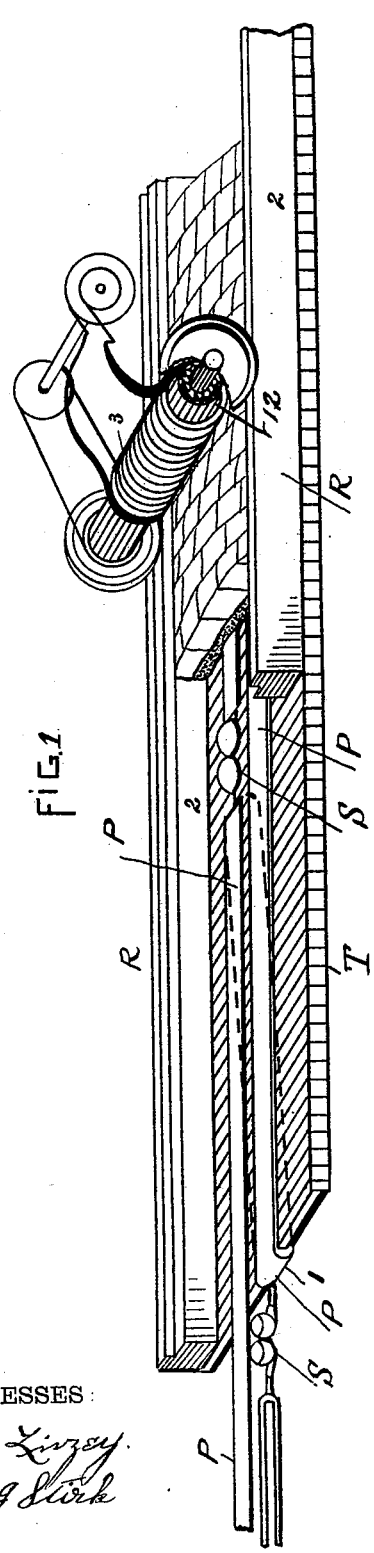
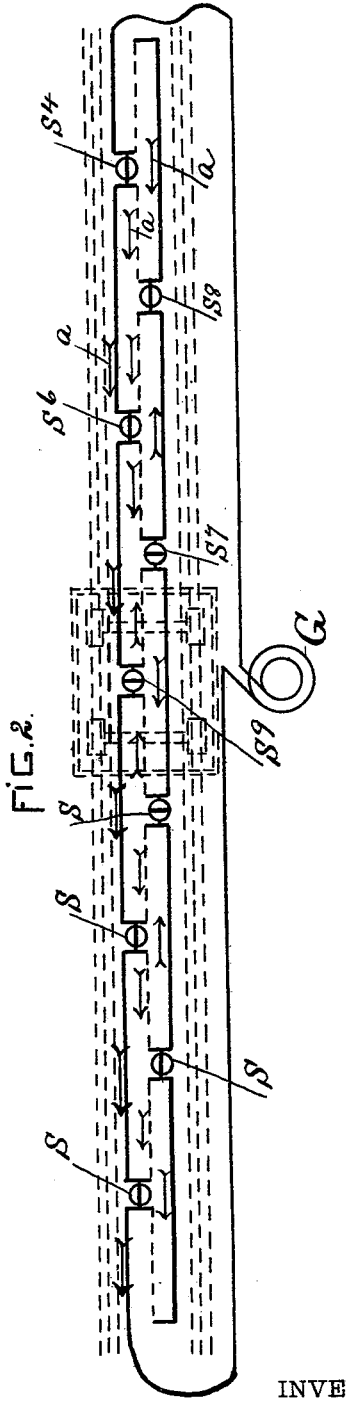
WITNESSES
INVENTOR

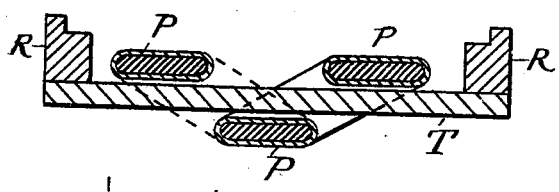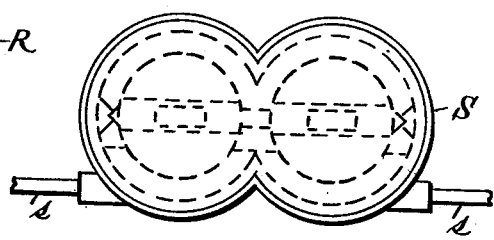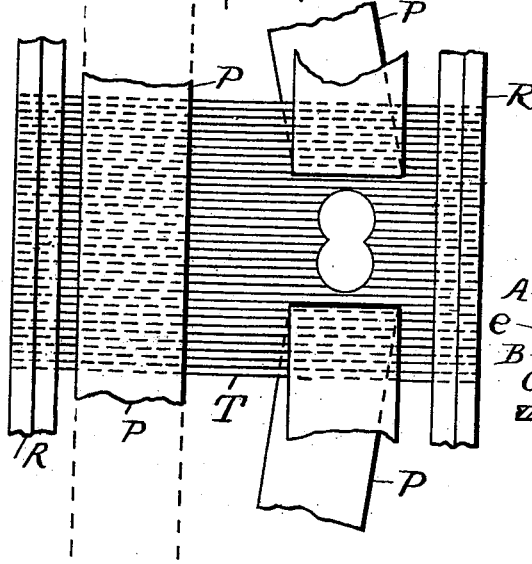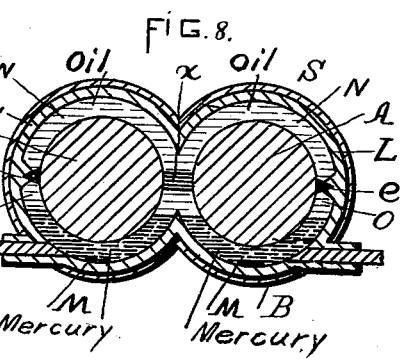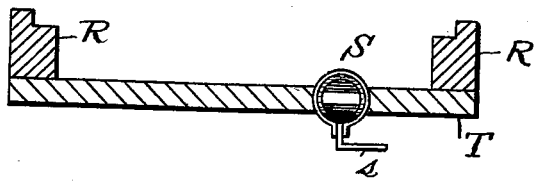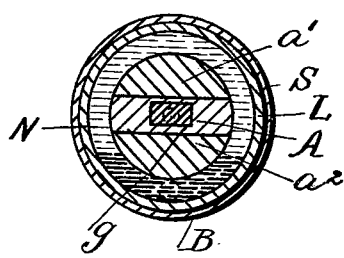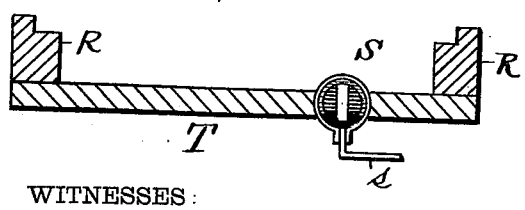

UNITED STATES PATENT OFFICE.

ALPHEUS C. SHUTTLEWORTH, OF PHILADELPHIA, PENNSYLVANIA, ASSIGNOR TO THE SHUTTLEWORTH ELECTRIC COMPANY, OF NEW JERSEY.

ELECTROMAGNETIC INDUCTION SYSTEM OF PROPULSION.

SPECIFICATION forming part of Letters Patent No. 554,962, dated February 18, 1896.

Application filed February 7, 1895. Serial No. 537,584. (No model.)

*To all whom it may concern:*

Be it known that I, ALPHEUS C. SHUTTLEWORTH, a citizen of the United States, residing at Philadelphia, in the county of Philadelphia and State of Pennsylvania, have invented certain new and useful Improvements in Electromagnetic Induction Systems of Propulsion; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a system of distribution of electric energy for the propulsion of cars, in which system is employed an alternating or interrupted current traversing a stationary primary conductor in inductive proximity to a moving secondary conductor, and also of stationary parts of a magnetic circuit and moving parts of a magnetic circuit. The stationary parts of the magnetic circuit are composed of iron rails and laminated-iron ties, both of which must be of sufficient area for conducting the requisite amount of magnetism induced by the primary circuit. The said primary circuit in my invention consists of an insulated conductor of a number of single convolutions embracing or encircling sections of laminated ties, said convolutions to be in parallel with the rails and at right angles with the laminated ties. The moving parts of the magnetic circuit is composed of the wheels and laminated iron core or axle. The secondary circuit is composed of an insulated conductor of a number of convolutions in close proximity and encircling the iron core or axle, said convolutions to be stationary upon the car and connected with motor for propulsion. At the junction of neighboring convolutions of the primary conductor-sections of wound road-bed I locate automatically-operating switches for the purpose of producing a series or multiple arrangement of the upper and lower sections of the convolutions on the different sections of road-bed, thereby at all times utilizing the conducting properties of the primary circuit and dispensing entirely with auxiliary feed-wires.

I have illustrated my system of electrical propulsion by the drawings herewith, in which—

Figure 1 is a perspective view of a section of finished road-bed, showing the iron rails and laminated-iron ties and a number of convolutions of the insulated primary conductor encircling the laminated-iron ties; also showing the position occupied by the automatically-operated switches and their connection and relationship to the primary convolutions and the moving parts of the magnetic conductors and secondary circuit. Fig. 2 is a plan view of the primary circuit of a number of convolutions, and illustrating the position of the automatic switches and their relationship to the said convolutions in their two directly-alternate positions, and showing the condition of the primary circuit when the car is upon the roadway, the full lines indicating parts of convolutions above the ties, designated as the "upper sections," and the broken lines parts of convolutions below the ties on the lower sections. Fig. 3 is a cross-sectional view of the iron rails, laminated-iron ties, and insulated primary conductor. Fig. 4 is a plan view of the road-bed, showing the iron rails and laminated-iron ties with a portion of the said laminated-iron ties removed at a suitable point for the reception of the automatically-operated switches and in proximity to neighboring convolutions of the primary conductor. Fig. 5 is a cross-sectional view of the laminated ties, which shows the exact position of the automatically-operating switch, the iron part or central zone of said switch being in alignment with the ties when under magnetic influence. Fig. 6 is a similar view of the said parts described in Fig. 5, but showing the automatically-operating switch with its iron part or central zone at right angle with the ties when it is free from magnetic influence. Fig. 7 is an enlarged side elevation of the automatic switch. Fig. 8 is a longitudinal vertical section of the said switch, representing its interior construction. Fig. 9 is a transverse vertical section of one of the spheres comprising the switch.

Similar letters and numbers correspond to like parts of the drawings.

In the construction of my improved system of electric railways I employ suitably-shaped rails R, which in cross-section afford a substantial and permanent tramway and also provide sufficient area for conducting the necessary amount of magnetism required to generate the current for the propulsion of the cars; and to the bottom of the rails are secured laminated-iron ties T, said ties being simply a number of iron bars laid parallel with each other and at right angle to the rails and of sufficient thickness and length to provide a durable and solid road-bed and also act as a competent magnetic conductor. Around these laminated ties T of lengthened sections is wound an insulated primary electric conductor P, said convolutions or windings being in a series of spirals encircling the ties and the upper and lower sections of said spirals being normally in parallel series throughout the length of the road, when the switches S are closed said convolutions being short-circuited, thereby connecting the upper and lower sections of adjoining convolutions in a series of parallel conductors by means of automatically-operated switches S when there are no cars upon that section of roadway.

The above-mentioned automatically-operating switches are each preferably constructed with iron armatures A forming central zones of spheres and metallically connected one with the other at $x$, the opposite sections, $a'$, of the said spheres being constructed of insulating material. That portion of the central zones A of the switch is overweighted at $g$ for a purpose hereinafter described. The said connected spheres are hermetically incased in a suitable metallic casing B, and are of a much less diameter than the interior of said casing and are together pivoted at $e$ in the walls of the same, the casing having an interior lining of insulation L. The difference in size between the spheres and the interior walls of the casing provides for a reservoir N, which is supplied both with oil O and mercury M. The mercury being the heavier of the fluids lies at the bottom of the divided reservoir in two parts.

Along the primary electric circuit 1 at regulated distances and in the magnetic circuit 2 are placed the above-described automatically-operating switches. The said switches are located at the junction of two convolutions, as shown in Figs. 1 and 4, for the purpose of electrically connecting at $s$ said convolutions of the primary conductor when no cars are on the rails of the section by the iron armature or bar A of said switch electrically connecting the mercury in the two reservoirs of the switch and short-circuiting the convolutions of the coils through the branch connections $s$ at the base of the switch when in its normal position.

When a car approaches a switch the resistance of the magnetic circuit of the section governed by the said switch will be lessened and the intensity of the magnetism increased, and the iron armature A of the switch will align itself with the laminated sleepers, as shown in Fig. 5, by magnetic action, at the same time severing its connection with the mercury at the ends of the convolutions, thereby throwing upper and lower sections of said convolutions in series for the purpose of intensifying the magnetism in said section. Said magnetism penetrating the iron wheels and iron core 17 will produce a current in said secondary circuit for the purpose of propelling the car by motor 18.

After a car has passed any particular switch, the magnetic circuit being lengthened, the magnetism through said switch-section of rails and laminated ties will decrease sufficiently to allow the unbalanced globe-shaped switch to right itself, joining the mercury, and assume the position shown in Fig. 6.

When the two ends of the primary conductor are connected at $p$ to the generator G, the current from said generator will traverse the primary conductor to switch $S^4$, there divide, flowing through the branches 11 12 13, as indicated by arrows $a$, to switch $S^6$, the conductor indicated by broken line being that part of the primary circuit traversing the under side of the ties, the current flowing in the direction of the arrow on said broken line, as indicated by No. 12, being in the same direction as the arrows on the full lines 11 and 13 and on opposite sides of the ties, the induction in the said ties will be reduced to a minimum. As the car is between the switches $S^7$ and $S^9$ and over switch $S^8$ said switches 7 8 9 will assume the position shown in Fig. 5, in line with laminated ties, thereby throwing the upper and lower sections of the winding in series, the current flowing in opposite directions above and below the ties in the direction of the arrows on broken and full lines, thereby intensely magnetizing the rails in the section of road-bed between the switches 7 8 9. The section between switches 5 and 7 being short-circuited by the switch $S^6$ in its normal condition, as shown in Figs. 2 and 6 of the drawings, will impede any excessive magnetic leakage from section in proximity to car.

All of the above conditions being substantially reproduced upon the opposite end of the car, the said conditions between switches 5 and 7 will be similar to those of 9 and 11 and those between 4 and 6 will be similar to those between switches 10 and 12. Switches 4, 5, 6, 10, 11, and 12 are shown in their normal positions.

The above result is successively reproduced in each section by the forward movement of the car.

The primary insulated conductor must be wound as far from rails as is practical upon the laminated ties for the purpose of preventing induced or secondary currents in said rails.

The ties are laminated at right angle to the insulated primary conductor for the purpose of preventing excessive induced or secondary current, the conductors $s$ being for the purpose of electrically connecting the convolutions with the mercury in the switch, for the purposes already described.

I claim—

In a system of distribution of electrical energy for railways, the combination with sections of laminated-iron ties, of a single insulated primary conductor wound around and at right angle above and below the sections of laminated ties in a series of single convolutions or spirals, said laminated ties forming stationary parts of a magnetic circuit, a movable part of the magnetic circuit, a secondary electric circuit encircling the movable part of the magnetic circuit, and automatic switches for producing a multiple or parallel arrangement of the upper and lower sections of the primary conductor when said switches are in their normal positions, substantially as described.

In testimony that I claim the foregoing as my invention I hereunto subscribe my name in the presence of two witnesses.

ALPHEUS C. SHUTTLEWORTH.

Witnesses:
LEWIS F. BROUS,
SILAS STIRK.